United States Patent
Cowen et al.

(10) Patent No.: US 7,853,659 B2
(45) Date of Patent: Dec. 14, 2010

(54) METHOD FOR PRESENTING PERSONALIZED, VOICE PRINTED MESSAGES FROM ONLINE DIGITAL DEVICES TO HOSTED SERVICES

(75) Inventors: Laura Jane Cowen, Southampton (GB); Guy Patrick Hindle, Southampton (GB); Bin Jia, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 12/277,464

(22) Filed: Nov. 25, 2008

(65) Prior Publication Data
US 2010/0131601 A1 May 27, 2010

(51) Int. Cl.
*G06F 15/16* (2006.01)
*G06F 12/00* (2006.01)

(52) U.S. Cl. .................. 709/206; 709/207; 709/231
(58) Field of Classification Search ......... 709/206–207, 709/223–229, 231, 236, 250
See application file for complete search history.

(56) References Cited

U.S. PATENT DOCUMENTS

| | | | |
|---|---|---|---|
| 6,466,654 B1 * | 10/2002 | Cooper et al. ............ 379/88.01 |
| 6,963,839 B1 | 11/2005 | Ostermann et al. |
| 7,103,548 B2 | 9/2006 | Squibbs et al. |
| 2002/0037074 A1 * | 3/2002 | Dowens et al. ........... 379/88.14 |
| 2004/0203613 A1 | 10/2004 | Zhu et al. |
| 2006/0019636 A1 | 1/2006 | Guglielmi et al. |
| 2007/0094330 A1 | 4/2007 | Russell |
| 2008/0043940 A1 * | 2/2008 | Davis et al. .............. 379/88.16 |
| 2010/0121629 A1 * | 5/2010 | Cohen ........................... 704/2 |

* cited by examiner

*Primary Examiner*—Zarni Maung
(74) *Attorney, Agent, or Firm*—Yee & Associates, P.C.; Elissa Y. Wang

(57) ABSTRACT

A computer implemented method presents a personalized multimedia message to a user. A text based message is received from a sender. Responsive to receiving the text based message, a sender profile is identified within a digital device host registry, the sender profile corresponding to the sender identifier. Responsive to identifying the sender profile within a digital device host registry, a set of corresponding personalized media channels associated with the sender profile is identified. The set of corresponding personalized media channels includes at least one of a voice profile, a static image, and lip synchronization data. The text based message is then augmented with the set of corresponding personalized media channels to create a multimedia message. The multimedia message comprises an audio file of the text message rendered by using the voice profile, a "video" file of text message rendered by using the voice profile, and the static image with the lip synchronization data, or a combination thereof. The multimedia message is then presented to the user.

1 Claim, 3 Drawing Sheets

METHOD FOR PRESENTING PERSONALIZED, VOICE PRINTED MESSAGES FROM ONLINE DIGITAL DEVICES TO HOSTED SERVICES

BACKGROUND OF THE INVENTION

1. Field of the Invention

The present invention relates generally to computer implemented methods. More specifically, the present invention relates to a computer implemented method for presenting a personalized multimedia message to a user.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce and is a source of information and entertainment. For many users, e-mail is a widely used format to communicate over the Internet. It is commonplace for users to send e-mail messages to other users through the Internet.

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications are also often used by users conducting business. By utilizing instant messaging, business users can view each other's availability and initiate a text conversation with colleagues or customers when a desired contact becomes available.

The use of e-mail messages and instant messaging is commonplace for personal and business use. E-mail messages and instant messaging are used by individuals to keep in touch with and communicate with other users. Additionally, e-mail messages provide a medium to collaborate and exchange documents.

SUMMARY OF THE INVENTION

A computer implemented method presents a personalized multimedia message to a user. A text based message is received from a sender. Responsive to receiving the text based message, a sender profile is identified within a digital device host registry, the sender profile corresponding to the sender identifier. Responsive to identifying the sender profile within a digital device host registry, a set of corresponding personalized media channels associated with the sender profile is identified. The set of corresponding personalized media channels includes at least one of a voice profile, a static image, and lip synchronization data. The text based message is then augmented with the set of corresponding personalized media channels to create a multimedia message. The multimedia message comprises an audio file of the text message rendered by using the voice profile, a "video" file of text message rendered by using the voice profile, and the static image with the lip synchronization data, or a combination thereof. The multimedia message is then presented to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
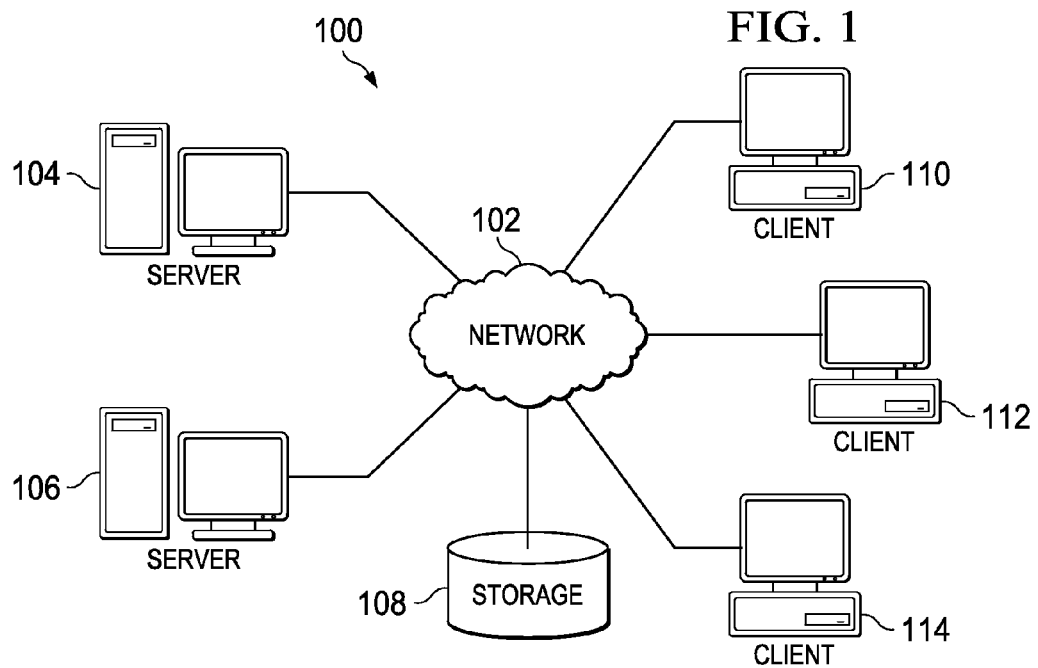
FIG. 1 is a pictorial representation of a network of data processing systems in which illustrative embodiments may be implemented.
Figure 2:
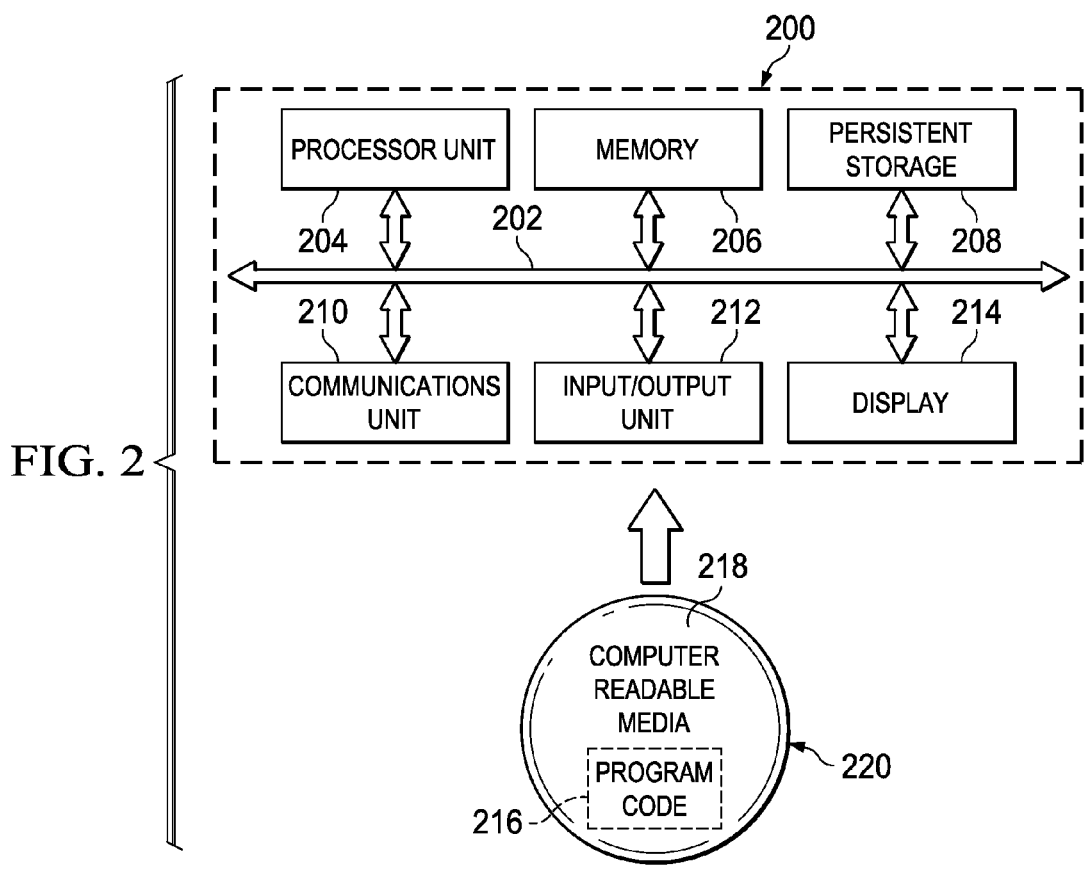
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
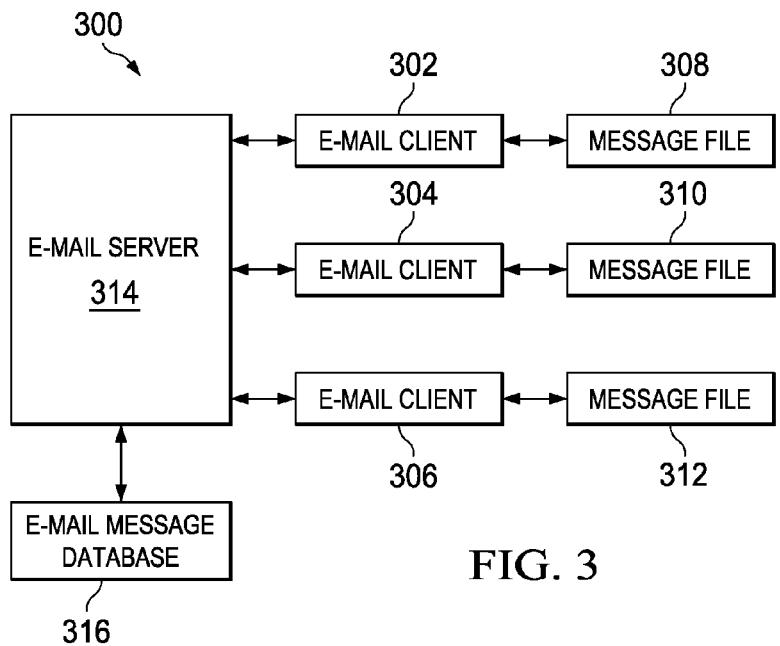
FIG. 3 is a diagram illustrating an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, 112, and 114 in FIG. 1. Message file 308, message file 310, and message file 312 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

The illustrative embodiments provide a computer implemented method that presents a personalized multimedia message to a user. A text based message is received from a sender. Responsive to receiving the text based message, a sender profile is identified within a digital device host registry, the sender profile corresponding to the sender identifier. Responsive to identifying the sender profile within a digital device host registry, a set of corresponding personalized media channels associated with the sender profile is identified. The set of corresponding personalized media channels includes at least one of a voice profile, a static image, and lip synchronization data. The text based message is then augmented with the set of corresponding personalized media channels to create a multimedia message. The multimedia message comprises an audio file of the text message rendered by using the voice profile, a "video" file of text message rendered by using the voice profile, and the static image with the lip synchronization data, or a combination thereof. The multimedia message is then presented to the user.

Figure 4:
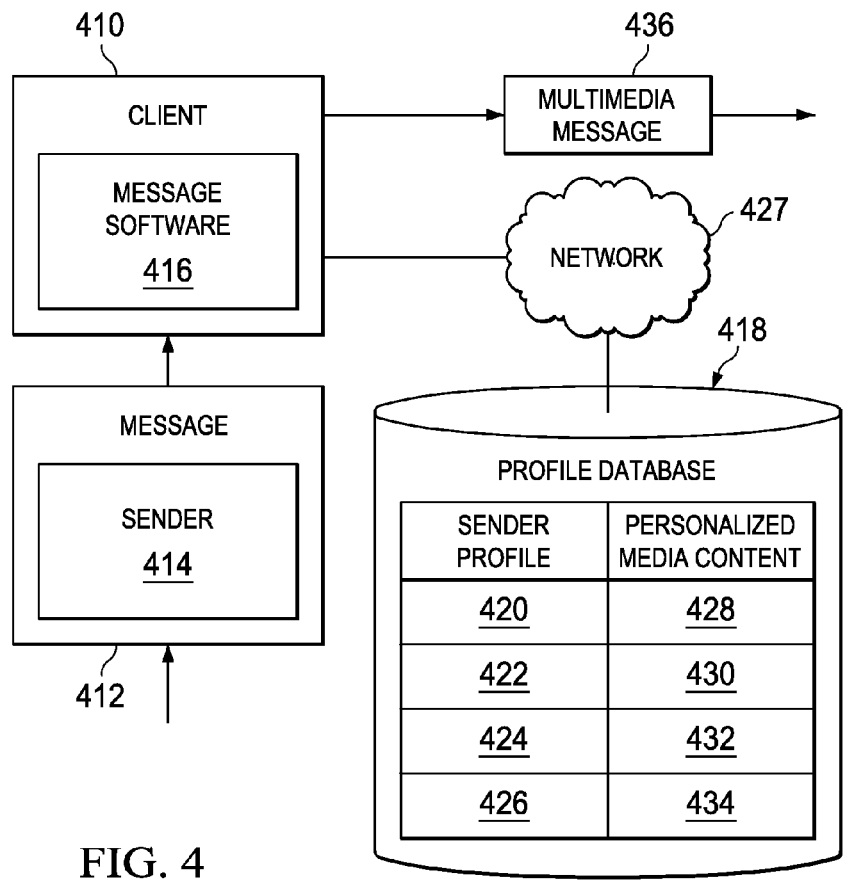
FIG. 4 is a data flow depicting components for the creation of multimedia messages from text based messages according to an illustrative embodiment.

Referring now to FIG. 4, a data flow depicting components for the creation of multimedia messages from text based messages is shown according to an illustrative embodiment. Client 410 can be a client, such as clients 110, 112, and 114 of FIG. 1.

Client 410 receives text based message 412. Text based message 412 is an e-mail, a text message, an instant message, or other textual communication from a sender. Text based message 412 includes a sender identifier 414. Sender identifier 414 can be, for example, but not limited to, the author of text based message 412.

Client 410 accesses text based message 412 using message software 416. Message software 416 can be an instant messaging client, or an e-mail client, such as email clients 302, 304, and 306 of FIG. 3. Message software 416 can be a commercially available instant messaging client or an e-mail client. Message software 416 can also be a plug-in software that works in conjunction with a commercially available instant messaging client or an e-mail client. Message software 416 identifies, or works in conjunction with an instant messaging client or an e-mail client to identify sender profiles and to generate multimedia messages based in part on text based message 412 and on the identified sender profile.

Responsive to a user accessing text based message 412, message software 416 identifies sender identifier 414 from text based message 412. Message software 416 then attempts to identify a related sender profile that corresponds to sender identifier 414.

Message software 416 accesses profile database 418. Profile database 418 is a data store containing sender profiles 420-426 and personalized media content 428-434 corresponding to each of sender profiles 420-426. In one illustrative embodiment, profile database 418 is a digital device host registry of a subscription service that is accessed across network 427. By maintaining an account within profile database 418 of the digital device host registry, sender identifier 414 is able to store personalized media content 428-434, which can be retrieved by client 410.

Sender profiles 420-426 are unique identifiers contained within profile database 418. Once established, sender profiles associate an account name or other identifier with personalized media content 428-434 for that account. In one illustrative embodiment, sender profiles 420-426 are account names or other identifiers corresponding to an e-mail address or instant messaging account name.

Associated with each of sender profiles 420-426 is one of personalized media content 428-434. Personalized media content 428-434 is data specific to each of the sender profiles 420-426 that can be used to personalize a text based message, such as text based message 412. Personalized media content 428-434 can include, but is not limited to voice profile data, static picture images, and lip synchronization data.

When message software 416 accesses profile database 418, message software 416 identifies one of sender profiles 420-426 that matches sender identifier 414. In one illustrative embodiment, sender identifier 414 matches sender profile 420. Message software 416 therefore retrieves personalized media content 428 that corresponds to sender profile 420.

Message software 416 then integrates personalized media content 428 with text based message 412 to create multimedia message 436. Multimedia message 436 is a visual, audio, or audio-visual representation of text based message 412, that is created by message software 416. An audio component of multimedia message 436 is created using any voice profile data of personalized media content 428, such that any audio of multimedia message 436 is presented in according to the voice profile.

In one illustrative embodiment, a voice profile of personalized media content 428 is a voice profile for a sender, which is sender identifier 414. Multimedia message 436 would then comprise at least an audio data file of text based message 412 utilizing the voice profile of the sender.

In another illustrative embodiment, a visual component of multimedia message 436 is created using any static picture images and lip synchronization data of personalized media content 428. Thus, multimedia message 436 is presented in according to the static picture images and lip synchronization data of personalized media content 428.

The static picture image of the personalized media content 428 may comprise a picture or digital image of the message sender. Message software 416 can then utilize the digital image, along with any lip synchronization data and an audio data file of text based message 412 to create an animated representation of the message sender, wherein multimedia message 436 comprises the animated representation.

The user of client 410 is therefore presented with multimedia message 436 instead of, or in addition to, text based message 412. Multimedia message 436 presents to the user an audio file created from text based message 412, in the sender's voice. Similarly Multimedia message 436 can present an animated audio and visual file of the text based message, utilizing the digital image, along with any lip synchronization data and the audio data file of text based message 412.

Figure 5:
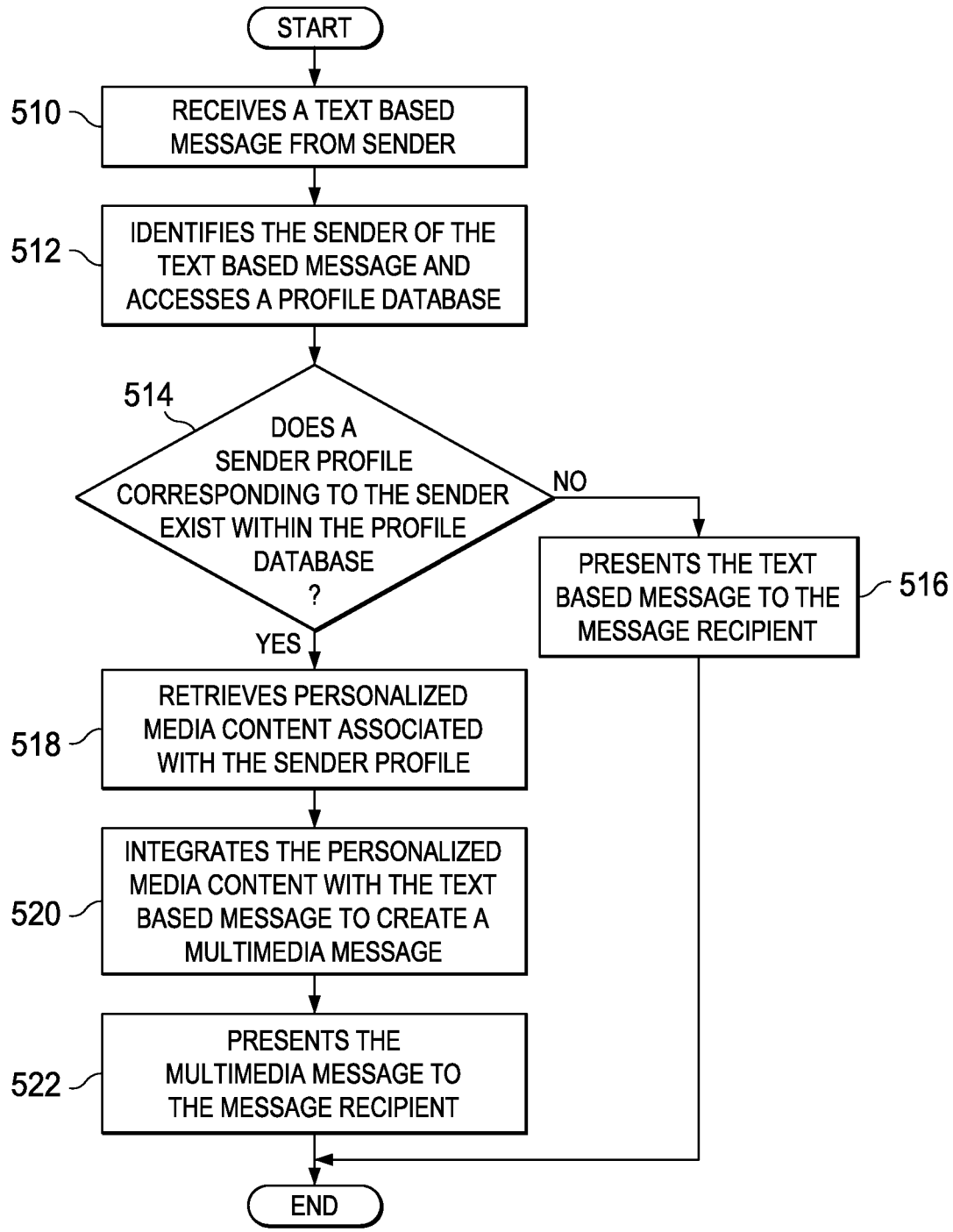
FIG. 5 is a flowchart illustrating the process steps for presenting a personalized multimedia message to a user.

Referring now to FIG. 5, a flowchart is shown illustrating the process steps for presenting a personalized multimedia message to a user. Process 500 is a software process executing on a software component, such as message software 416 of FIG. 4.

Process 500 begins by receiving a text based message from a sender (step 510). The text based message can be text based message 412 of FIG. 4. The text based message includes a sender who can be, for example, but not limited to, the author of the text based message.

Responsive to receiving the text based message, process 500 identifies the sender of the text based message (step 512) and accesses a profile database. The profile database can be profile database 418 of FIG. 4. Process 500 then identifies whether a sender profile corresponding to the sender exists within the profile database (step 514).

Responsive to not identifying a corresponding sender profile within the profile database ("No" at step 514), process 500 presents the text based message to the message recipient (step 516), which can be client 410 of FIG. 4, and the process terminates thereafter. Process 500 can therefore still function as a message viewer, even in the absence of a corresponding sender profile.

Returning now to step 514, responsive to identifying a corresponding sender profile within the profile database ("Yes" at step 514), process 500 retrieves personalized media content associated with the sender profile (step 518). The personalized media content can include, but is not limited to, a voice profile, a static image, and lip synchronization data.

Responsive to retrieving the personalized media content, process 500 augments the personalized media content with the text based message to create a multimedia message (step 520). The multimedia message can be multimedia message 436 of FIG. 4.

Process 500 then presents the multimedia message to a message recipient (step 522), with the process terminating thereafter. The message recipient is therefore presented with the multimedia message instead of, or in addition to, the text based message. The multimedia message presents to the message recipient an audio file created from the text based message, in the sender's voice. Similarly the multimedia message can present an animated audio and visual file of the text based message, utilizing the digital image, along with any lip synchronization data and the audio data file of the text based message.

Thus the illustrative embodiments provide a computer implemented method which presents a personalized multimedia message to a user. A text based message is received from a sender. Responsive to receiving the text based message, a sender profile is identified within a digital device host registry, the sender profile corresponding to the sender identifier. Responsive to identifying the sender profile within a digital device host registry a set of corresponding personalized media channels associated with the sender profile is identified. The set of corresponding personalized media channels includes at least one of a voice profile, a static image, and lip synchronization data. The text based message is then augmented with the set of corresponding personalized media channels to create a multimedia message. The multimedia message comprises an audio file of the text message rendered by using the voice profile, a "video" file of text message rendered by using the voice profile, and the static image with the lip synchronization data, or a combination thereof. The multimedia message is then presented to the user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of presenting a personalized multimedia message to a user, comprising:

receiving a text based message from a sender, the message including a sender identifier;

responsive to receiving the text based message, connecting through a network to a digital device host registry;

responsive to receiving the text based message, identifying a sender profile within the digital device host registry, the sender profile corresponding to the sender identifier;

responsive to identifying the sender profile within a digital device host registry, identifying a set of corresponding personalized media channels from within the digital device host registry, wherein corresponding personalized media channels are the associated with the sender profile, wherein the set of corresponding personalized media channels includes at least one of a voice profile, a static image, and lip synchronization data;

augmenting the text based message with the set of corresponding personalized media channels to create a multimedia message, wherein the multimedia message comprises a audio file of the text message rendered by using the voice profile, a "video" file of text message rendered by using the voice profile, and the static image with the lip synchronization data, or a combination thereof, wherein the step of augmenting the text based message with the set of corresponding personalized media channels to create a multimedia message comprises converting the text based message to a voice message based on the sender voice profile; and presenting the multimedia message to the user.

\* \* \* \* \*